(12) United States Patent
Samuni et al.

(10) Patent No.: US 11,002,456 B2
(45) Date of Patent: *May 11, 2021

(54) METHOD AND SYSTEM FOR HVAC INEFFICIENCY PREDICTION USING HOUSEHOLD ELECTRICAL SMART METER DATA

(71) Applicant: GRID4C, Tel Aviv (IL)

(72) Inventors: Eran Samuni, Giv'atayim (IL); Eran Cohen, Ramat Gan (IL); Nathaniel Shimoni, Be'er Sheva (IL); Noa Rimini, Raanana (IL)

(73) Assignee: GRID4C, Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/849,225

(22) Filed: Apr. 15, 2020

(65) Prior Publication Data

US 2020/0355387 A1 Nov. 12, 2020

Related U.S. Application Data

(63) Continuation of application No. PCT/IL2019/050926, filed on Aug. 19, 2019.

(Continued)

(51) Int. Cl.
*F24F 11/46* (2018.01)
*F24F 11/32* (2018.01)
(Continued)

(52) U.S. Cl.
CPC .............. *F24F 11/46* (2018.01); *F24F 11/32* (2018.01); *F24F 11/64* (2018.01); *F24F 11/80* (2018.01);

(Continued)

(58) Field of Classification Search
CPC .. F24F 11/46; F24F 11/32; F24F 11/80; F24F 2140/60; F24F 2130/10; F24F 2110/12
(Continued)

(56) References Cited

U.S. PATENT DOCUMENTS

2010/0211224 A1 8/2010 Keeling et al.
2012/0290230 A1* 11/2012 Berges Gonzalez ... G01D 4/004
702/61

(Continued)

FOREIGN PATENT DOCUMENTS

WO 2017153997 A1 9/2017
WO 2017179049 A1 10/2017
WO 2018225064 A1 12/2018

*Primary Examiner* — Md Abul Azad
(74) *Attorney, Agent, or Firm* — Browdy and Neimark, P.L.L.C.

(57) ABSTRACT

A method for monitoring heating, ventilation, and air conditioning (HVAC) systems includes: Obtaining first training data for HVACs in a training set of households during a first period of spring weather; Obtaining second training data during a period of summer weather, Preprocessing the training data to identify repeating patterns of HVAC consumption or generating additional derived parameters, in an aggregation process; Calculating the amount of energy required to change house temperature; Applying the first training data and the classification labels to train a supervised machine learning algorithm, to generate an HVAC classification model predictive of inefficiency during periods of summer weather conditions; Obtaining operational data pertaining to HVACs in an operational set of households during a second period of spring weather; and Applying the HVAC classification model to predict inefficiency of HVACs at individual households in the operational set, during periods of summer weather using only overall household power consumption.

22 Claims, 12 Drawing Sheets

Related U.S. Application Data

(60) Provisional application No. 62/719,804, filed on Aug. 20, 2018.

(51) Int. Cl.
    *F24F 11/80*     (2018.01)
    *F24F 11/64*     (2018.01)
    *F24F 140/60*     (2018.01)
    *F24F 130/10*     (2018.01)
    *F24F 110/12*     (2018.01)

(52) U.S. Cl.
    CPC ....... *F24F 2110/12* (2018.01); *F24F 2130/10* (2018.01); *F24F 2140/60* (2018.01)

(58) Field of Classification Search
    USPC ........................................................ 700/276
    See application file for complete search history.

(56) References Cited

U.S. PATENT DOCUMENTS

| | | | |
|---|---|---|---|
| 2014/0172400 A1* | 6/2014 | Majewski | F24F 1/0035 |
| | | | 703/18 |
| 2014/0324240 A1* | 10/2014 | Thottan | G05B 13/04 |
| | | | 700/291 |
| 2015/0057810 A1 | 2/2015 | Smith et al. | |
| 2016/0187896 A1* | 6/2016 | Jones | F24F 11/62 |
| | | | 700/276 |
| 2016/0377309 A1 | 12/2016 | Abiprojo et al. | |
| 2018/0334012 A1* | 11/2018 | Geller | B60H 1/00392 |
| 2019/0353377 A1* | 11/2019 | Mao | F24F 11/58 |

\* cited by examiner

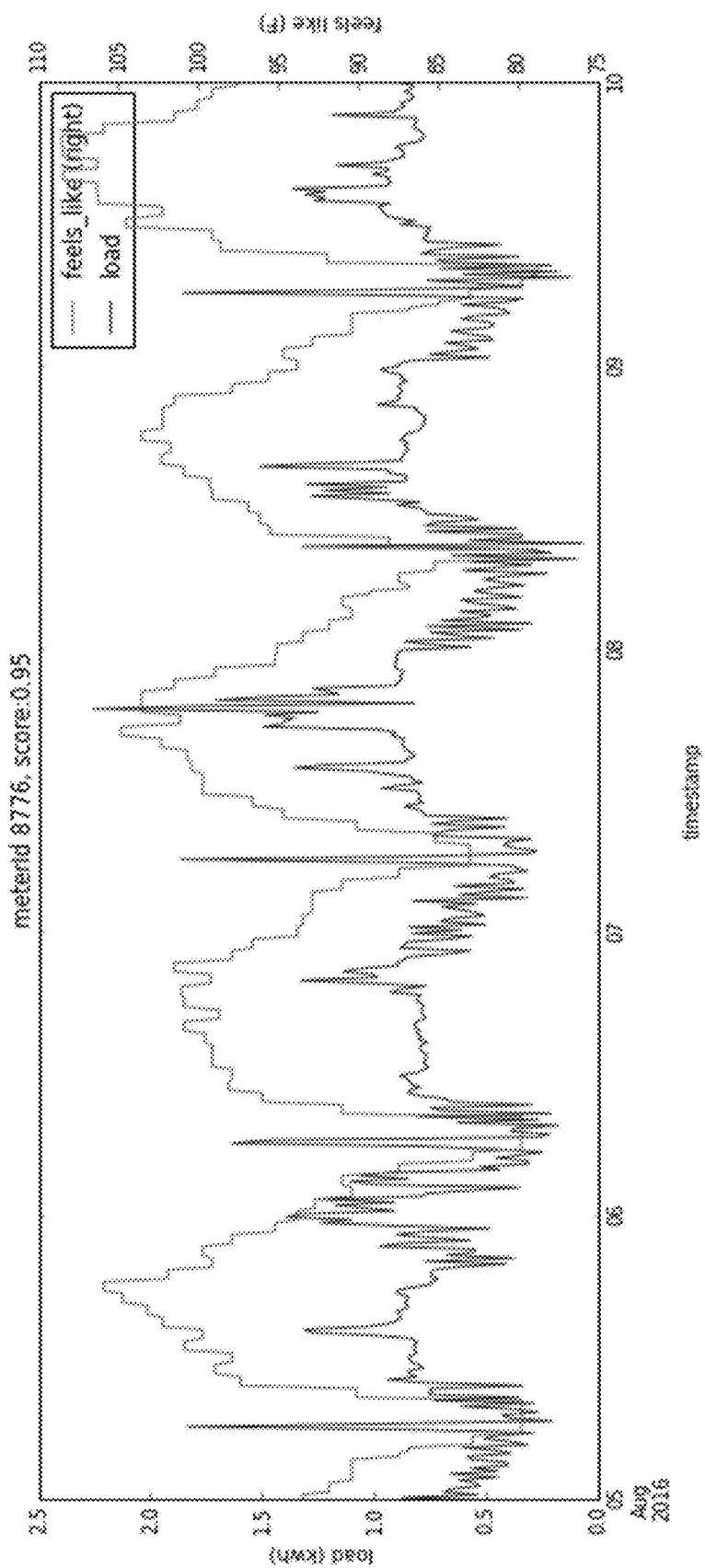
Figure 4a: Valid HVAC (sample week, house load)

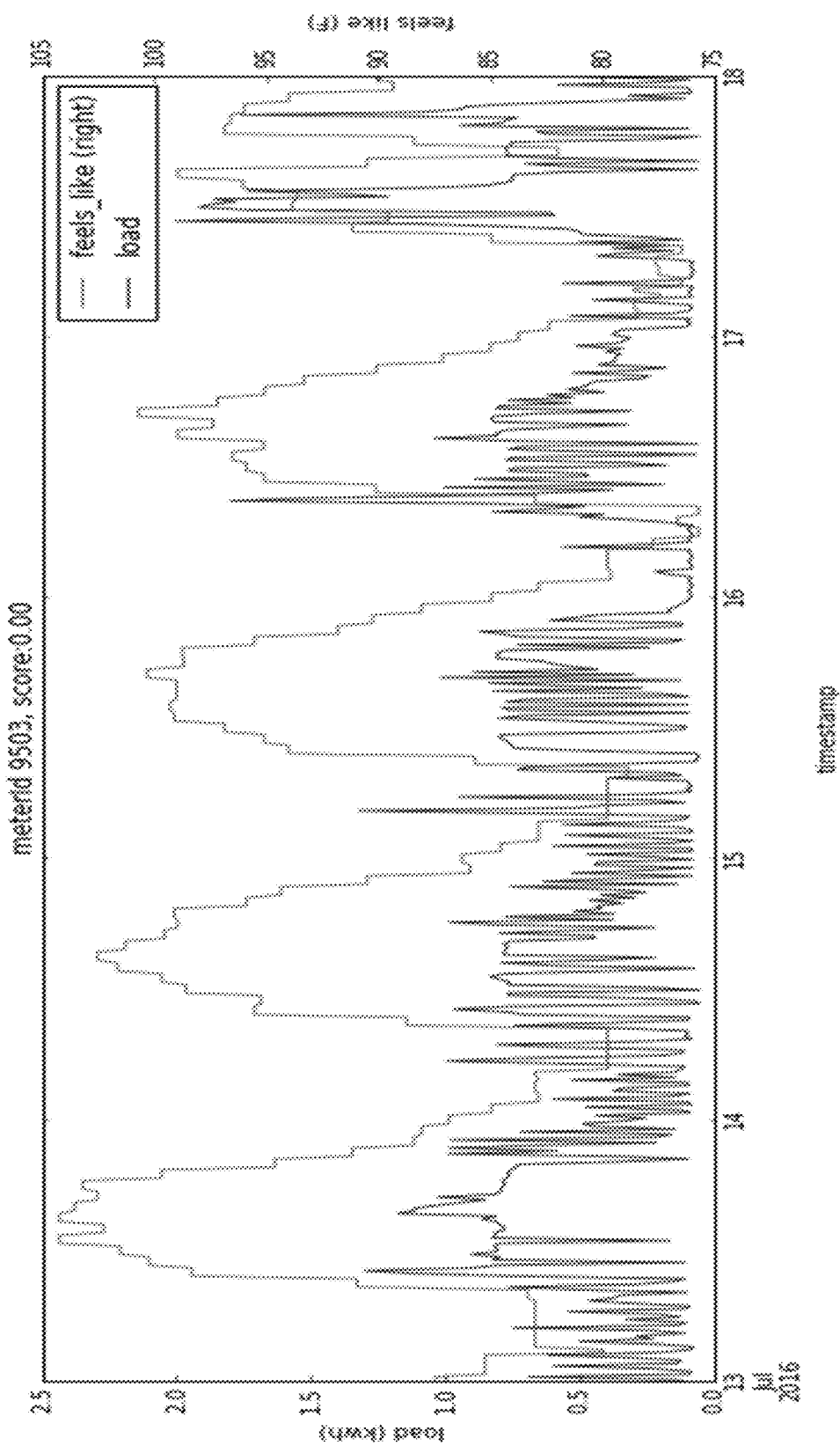
Figure 4b: Malfunctioned HVAC (sample week, house load)

METHOD AND SYSTEM FOR HVAC INEFFICIENCY PREDICTION USING HOUSEHOLD ELECTRICAL SMART METER DATA

FIELD OF THE INVENTION

The invention generally relates to the field of monitoring devices, in particular electronic appliances.

BACKGROUND

Inefficiency of electrical appliances in general and of heating, ventilation, and air conditioning (HVAC) systems in particular is a main cause for energy waste and unnecessary expenditure. Some methods for identifying needed HVAC maintenance rely on HVAC systems to provide self-test output. This HVAC feature is generally available only on industrial systems, meaning that determining inefficient operation, is typically unavailable for a residential application and is only detected when an HVAC fails to perform satisfactorily in summer weather. A residential method for identifying HVAC maintenance needs could reduce home owner costs.

SUMMARY

The present invention provides a method for monitoring a plurality of heating, ventilation, and air conditioning (HVAC) systems and predicting inefficient HVAC operation, implemented by one or more processors operatively coupled to a non-transitory computer readable storage device, on which are stored modules of instruction code that when executed cause the one or more processors to perform the following steps:
  Obtaining first training data for HVACs in training set of households during a first period of spring weather,
  Obtaining second training data for HVACs in the training set of households during a period of summer weather,
  Preprocessing the training data to identify repeating patterns of HVAC consumption or generating additional derived parameters, in an aggregation process
  Calculating a "Household Efficiency Score": the amount of energy required to change house temperature in relation to house size;
  Applying the first training data and the classification labels to train a supervised machine learning algorithm, to generate an HVAC classification model predictive of inefficiency during periods of summer weather conditions;
  Obtaining operational data pertaining to HVACs in an operational set of households during a second period of spring weather; and applying the HVAC classification model to predict inefficiency of HVACs at individual households in the operational set during periods of summer weather using only overall household power consumption.

The present invention provide A method for monitoring a plurality of heating, ventilation, and air conditioning (HVAC) systems and predicting inefficient HVAC operation, implemented by one or more processors operatively coupled to a non-transitory computer readable storage device, on which are stored modules of instruction code that when executed cause the one or more processors to perform the following steps:
  obtaining first training data for HVACs in a training set of households during a first predefined period weather;
  obtaining second training data for HVACs in the training set of households during a second predefined period weather;
  preprocessing the training data to identify repeating patterns of HVAC coemption or generating additional derived parameters, in an aggregation process calculating a "Household Efficiency Score": the amount of energy required to change house temperature;
  applying the first training data and the classification labels to train a supervised machine learning algorithm, to generate an HVAC classification model predictive of inefficiency during periods of second predefined period weather conditions;
  obtaining operational data pertaining to HVACs in an operational set of households during a recent first time period weather; and applying the HVAC classification model to predict inefficiency of HVACs at individual households in the operational set during periods of future second predefined period weather using only overall household power consumption.

According to some embodiments of the present invention the training data include:
Frequent regular household power consumption readings; Indoor temperature; Outdoor temperature; household-specific parameters including at least one of HVAC's properties, the household profile parameters and residents' profile parameters, wherein the HVAC properties, include at least one of type, nominal power, age and HVAC ratings, including Energy Efficiency Rating (EER), Seasonal Energy Efficiency Rating (SEER), Coefficient of Performance (COP), and Heating Seasonal Performance Factor (HSPF).

According to some embodiments of the present invention the calculating further include calculating HVAC Linear Coefficient and Breakpoint Temperature Difference.

According to some embodiments of the present invention the classification module distinguishes between efficient and inefficient households, wherein inefficient is determined in case not being able to reach within predefined time of the predefined set temperature.

According to some embodiments of the present invention a daily score for the HVAC efficiency is based on pattern recognition algorithms for identifying repeating pattern behavior of normal behavior of the HVAC.

According to some embodiments of the present invention the power consumption measurement readings are measured granularity of a single reading each predefined interval from a smart household power meter.

According to some embodiments of the present invention the method further comprising the steps of correlating the HVAC compressor activation time with the household's overall power consumption readings, to create a disaggregation model for deriving an estimate of HVAC time based power consumption from the overall household power consumption, where in based on the disaggregation model, are derived parameters for the training model.

According to some embodiments of the present invention wherein the HVAC efficiency classification are further based on additional classifiers, including at least one of: whether the HVAC is malfunctioning, whether under-sized or oversized, insufficient insulation.

According to some embodiments of the present invention the training include acquire, during periods of second predefined period weather data which indicates whether the HVAC has efficiently reached the thermostat setting temperature, this data serves as feedback for supervising the training of the HVAC efficiency classification model.

According to some embodiments of the present invention the training process include generating additional derived parameters including the distribution of monthly HVAC efficiency scores over different temperature bins, which indicate HVAC responsiveness to temperature.

According to some embodiments of the present invention in case of a suspected malfunction, calculates the excess in power consumption in comparison with similar households, to produce a malfunction "price tag".

The present invention provides a system for monitoring a plurality of heating, ventilation, and air conditioning (HVAC) systems and predicting inefficient HVAC operation, said system comprising a non-transitory storage device and one or more processing devices operatively coupled to the storage device on which are stored modules of instruction code executable by the one or more processors:

data Accumulation Module for obtaining first training data for HVACs in a training set of households during a first period of weather and obtaining second training data for HVACs in the training set of households during a second period of weather;

preprocessing module for analyzing the training data to identify repeating patterns of HVAC consumption or generating additional derived parameters, in an aggregation process training module for calculating a "Household Efficiency Score": the amount of energy required to change house temperature and for applying the first training data and the classification labels to train a supervised machine learning algorithm, to generate an HVAC classification model predictive of inefficiency during periods of summer weather conditions;

prediction module for obtaining operational data pertaining to HVACs in an operational set of households during a recent first period of weather; and applying the HVAC classification model to predict inefficiency of HVACs at individual households in the operational set during future second periods of weather using only overall household power consumption.

According to some embodiments of the present invention the training data include: Frequent regular household power consumption readings; Indoor temperature; Outdoor temperature; household-specific parameters including at least one of HVAC's properties, the household profile parameters and residents' profile parameters, wherein the HVAC properties, include at least one of type, nominal power, age and HVAC ratings, including Energy Efficiency Rating (EER), Seasonal Energy Efficiency Rating (SEER), Coefficient of Performance (COP), and Heating Seasonal Performance Factor (HSPF).

According to some embodiments of the present invention the calculating further include calculating HVAC Linear Coefficient and Breakpoint Temperature Difference.

According to some embodiments of the present invention the system further comprising classification module distinguishes between efficient and inefficient households, wherein inefficient is determined in case not being able to reach within predefined time period of the predetermined desired set temperature.

According to some embodiments of the present invention a daily score for the HVAC efficiency is based on pattern recognition algorithms for identifying repeating pattern behavior of normal behavior of the HVAC.

According to some embodiments of the present invention the power consumption measurement readings are measured granularity of a single reading each predefined interval from a smart household power meter.

According to some embodiments of the present invention comprising the steps of correlating the HVAC compressor activation time with the household's overall power consumption readings, to create a disaggregation model for deriving an estimate of HVAC time based power consumption from the overall household power consumption, where in based on the disaggregation model, are derived parameters for the training model.

According to some embodiments of the present invention the HVAC efficiency classification are further based on additional classifiers, including at least one of: whether the HVAC is malfunctioning, whether undersized or oversized, insufficient insulation.

According to some embodiments of the present invention training include acquire, during periods of second predefined period weather, data which indicates whether the HVAC has efficiently reached the thermostat setting temperature, this data serves as feedback for supervising the training of the HVAC efficiency classification model.

According to some embodiments of the present invention the training process include generating additional derived parameters including the distribution of monthly HVAC efficiency scores over different temperature bins, which indicate HVAC responsiveness to temperature.

According to some embodiments of the present invention in case of a suspected malfunction, calculates the excess in power consumption in comparison with similar households, to produce a malfunction "price tag".

BRIEF DESCRIPTION

For a better understanding of various embodiments of the invention and to show how the same may be carried into effect, reference will now be made, purely by way of example, to the accompanying drawings in which like numerals designate corresponding elements or sections throughout. Figures are presented in what is believed to be the most useful and readily understood form for the description of the principles and conceptual aspects of the invention. In this regard, no attempt is made to show structural details of the invention in more detail than is necessary for a fundamental understanding of the invention, the description, taken with the drawings, making apparent to those skilled in the art how the several forms of the invention may be embodied in practice. In the accompanying drawings:

FIG. 4A is a graph of empirical measurements, depicting of consumption behavior during defined period against set temperature and indoor temperature of normal behavior;

FIG. 4b is a graph of empirical measurements, depicting of consumption behavior during defined period against set temperature and indoor temperature of abnormal behavior;

Figure 5:
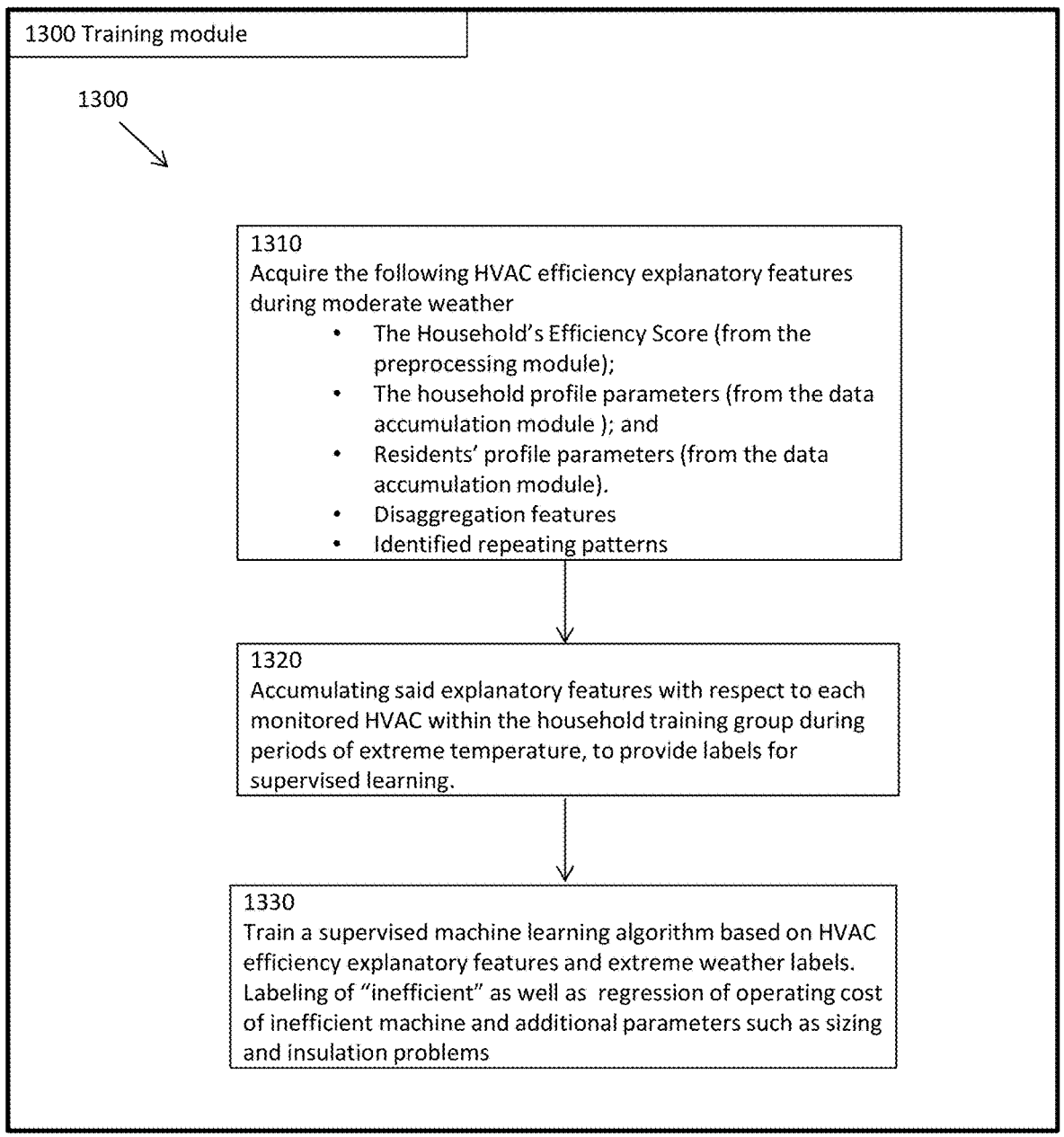
Figure 6:
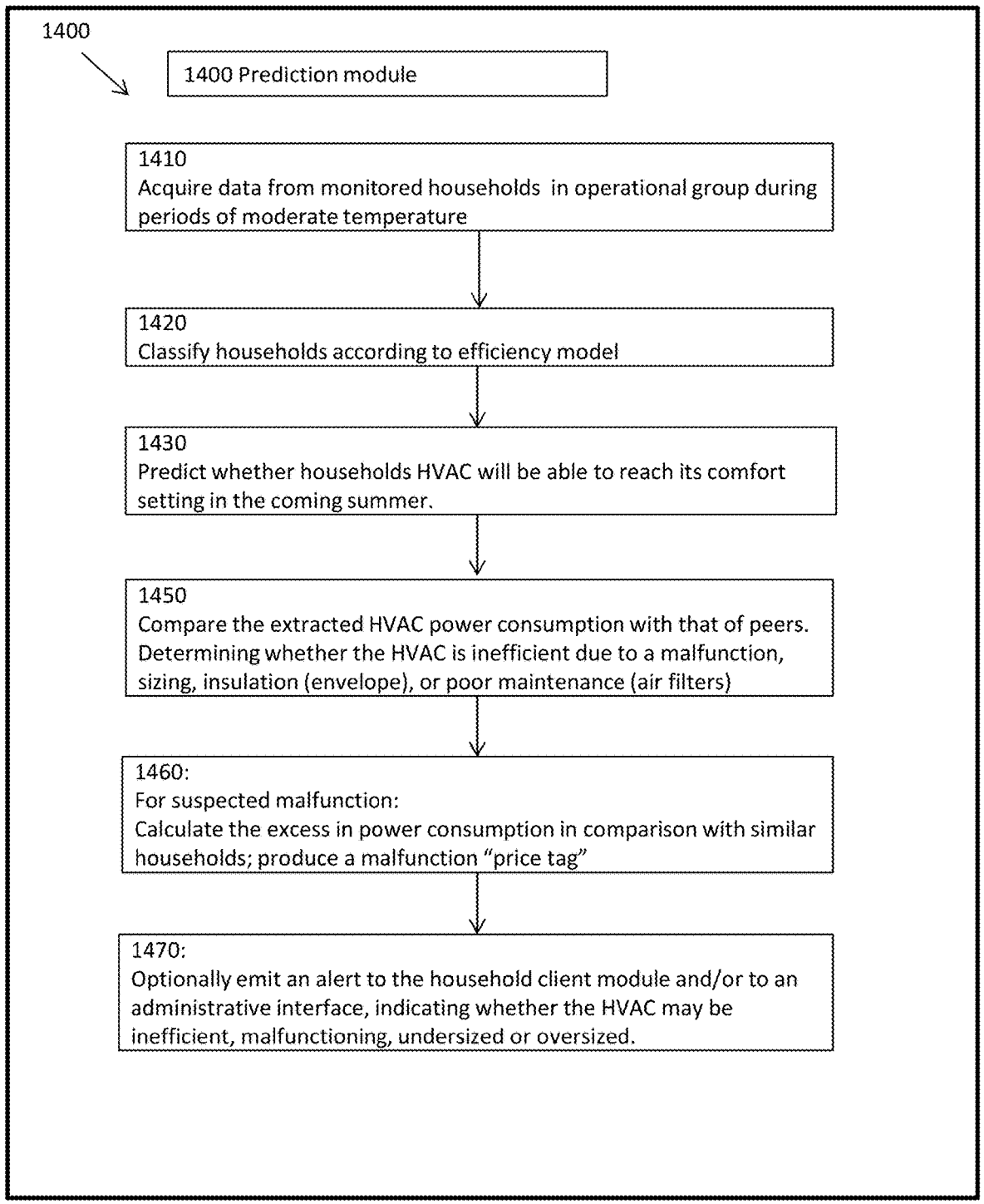

FIG. 5 is a flow diagram depicting the function of a training module, running within the server, to classify training group households according to an HVAC efficiency classification model, wherein households are classified as either "efficient" or "inefficient", i.e., whether an HVAC would efficiently reach the thermostat settings during periods of summer weather (i.e., cooling during summer time, or heating during winter time), according to some embodiments of the present invention;

FIG. 6 is a flow diagram depicting the function of the prediction module 1400, running within the server 100, configured to apply the HVAC efficiency classification model to data from an operational group of households, according to some embodiments of the present invention.

Figure 7:
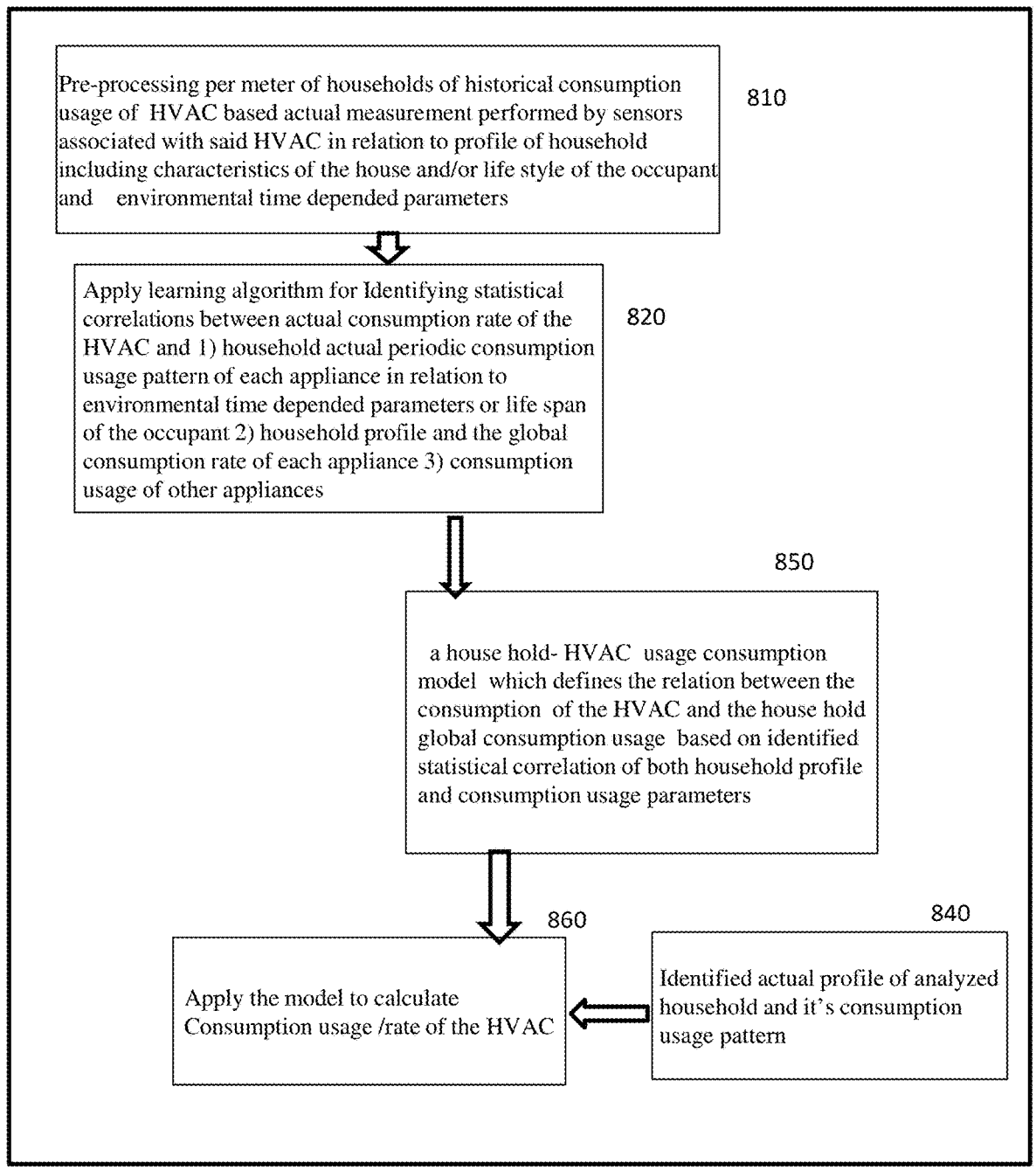

FIG. 7 is a flow diagram depicting the function a household HVAC consumption usage model according to some embodiments of the preset invention.

Figure 8:
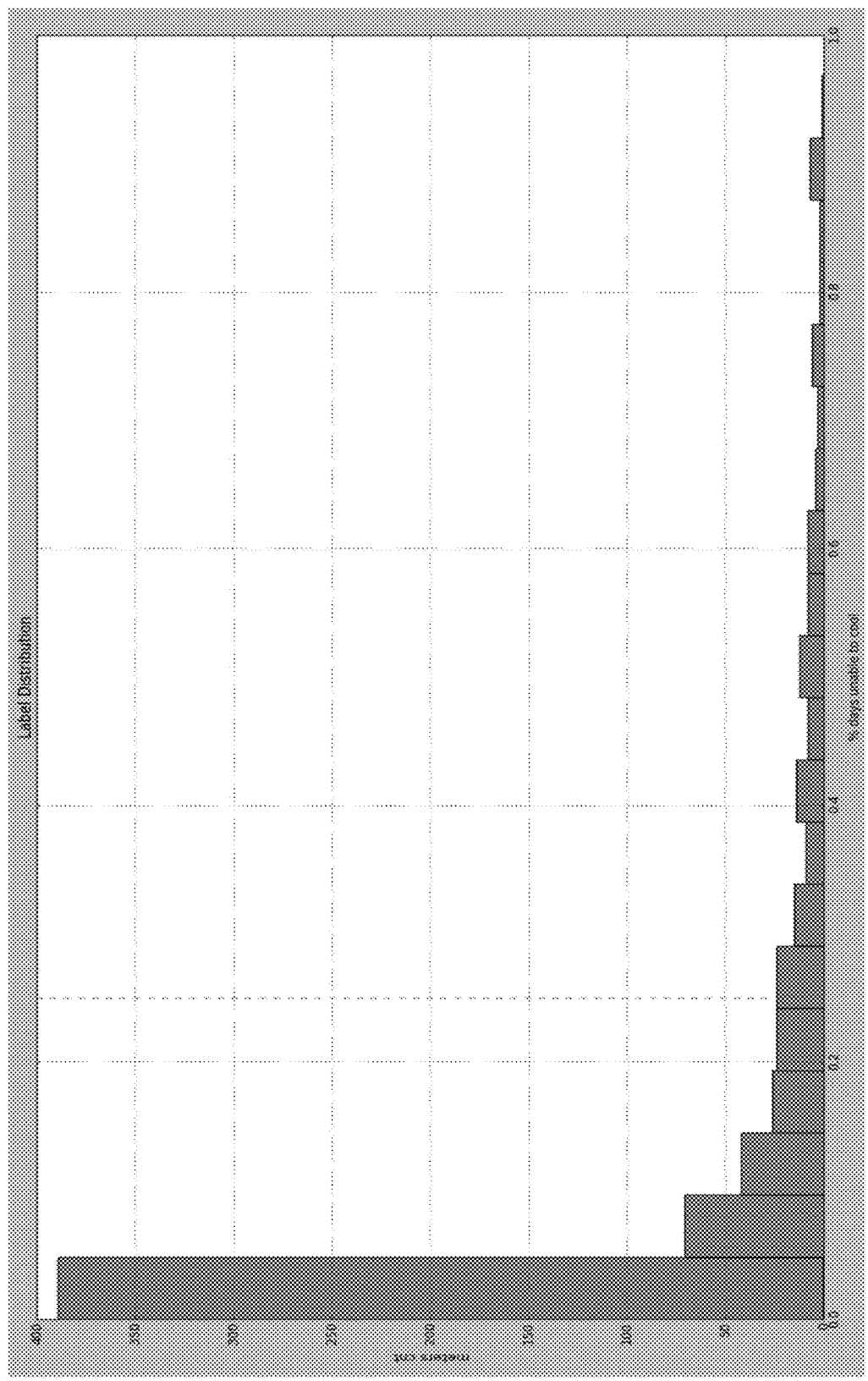
Figure 9:
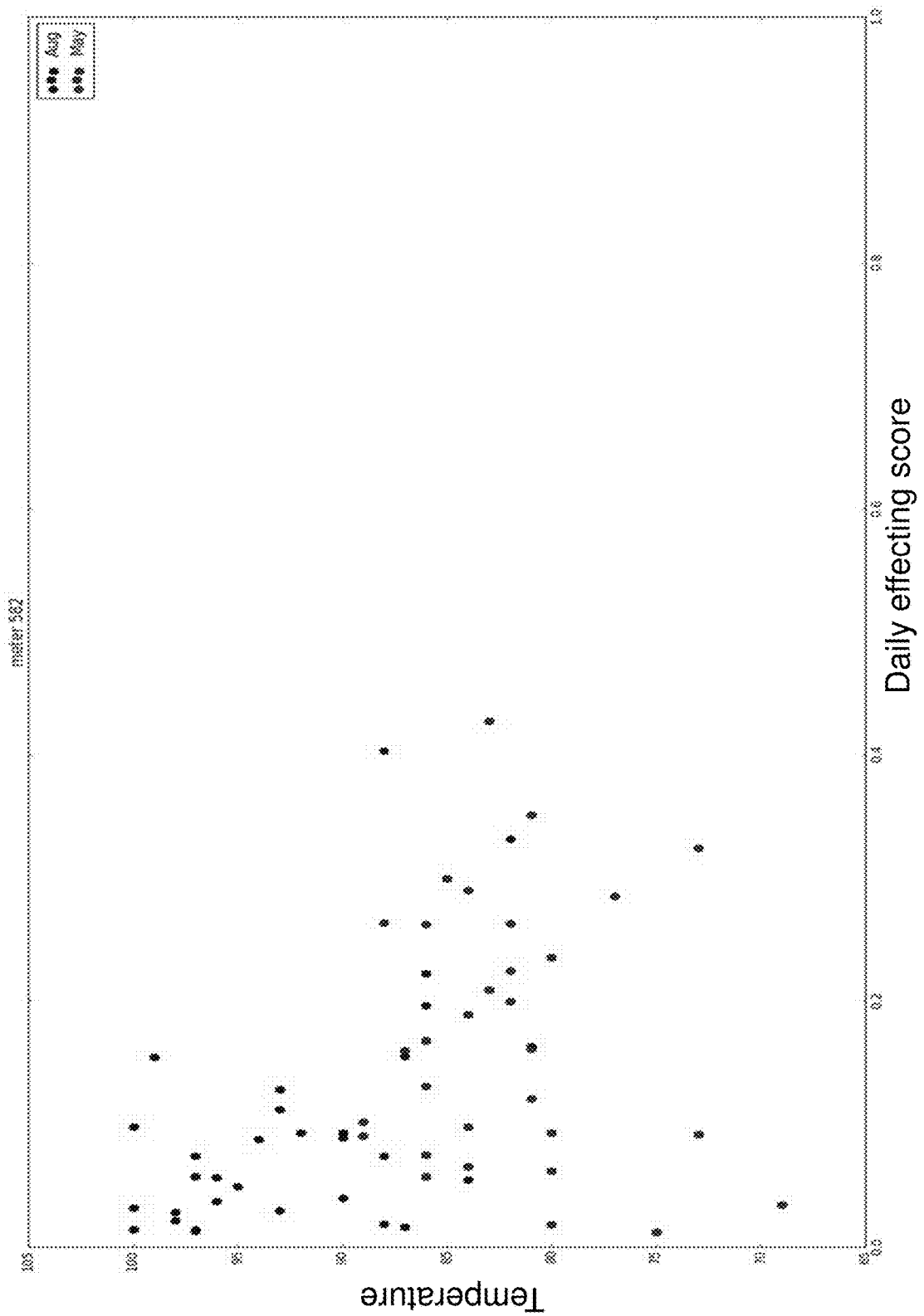
Figure 10:
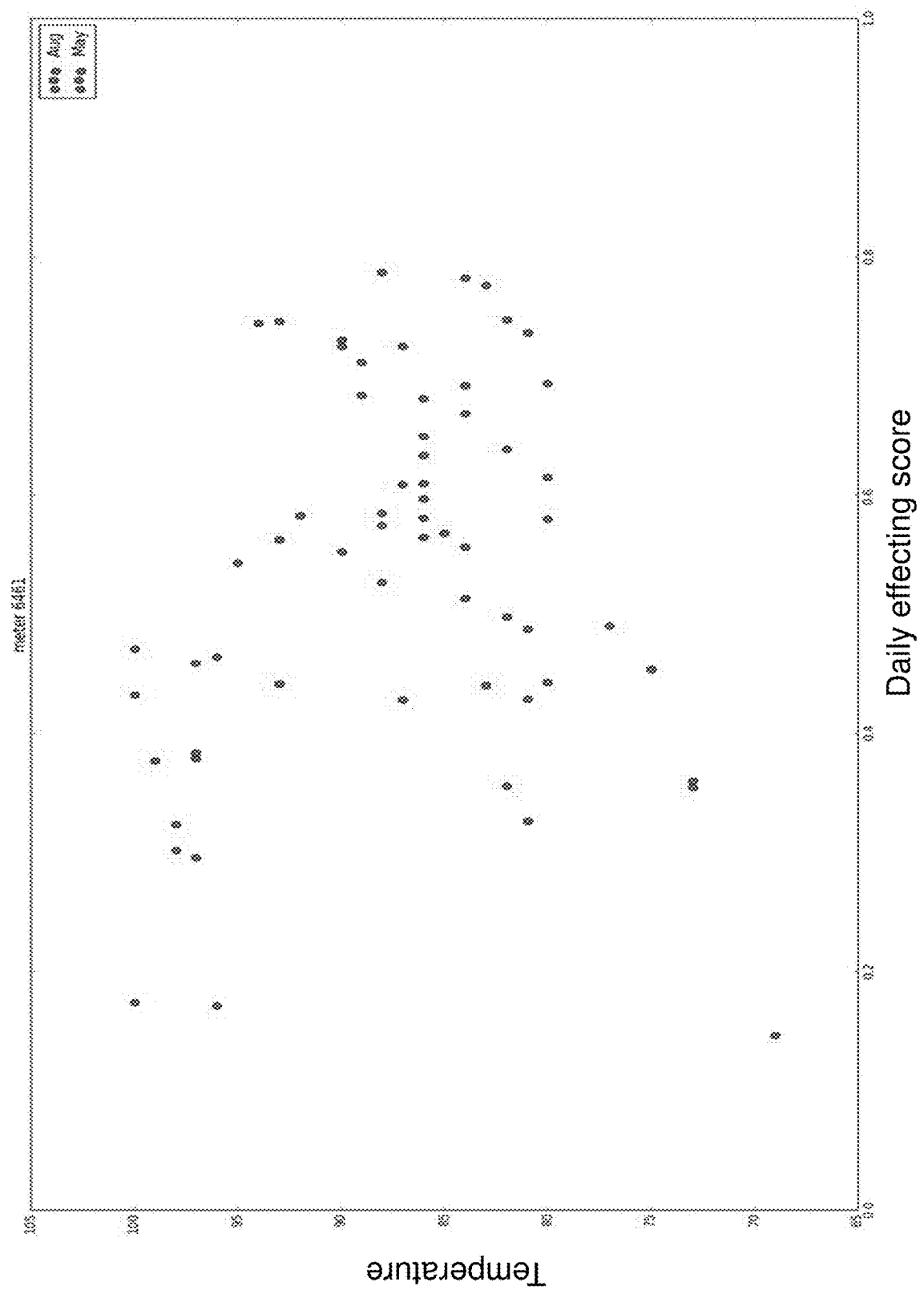
Figure 11:
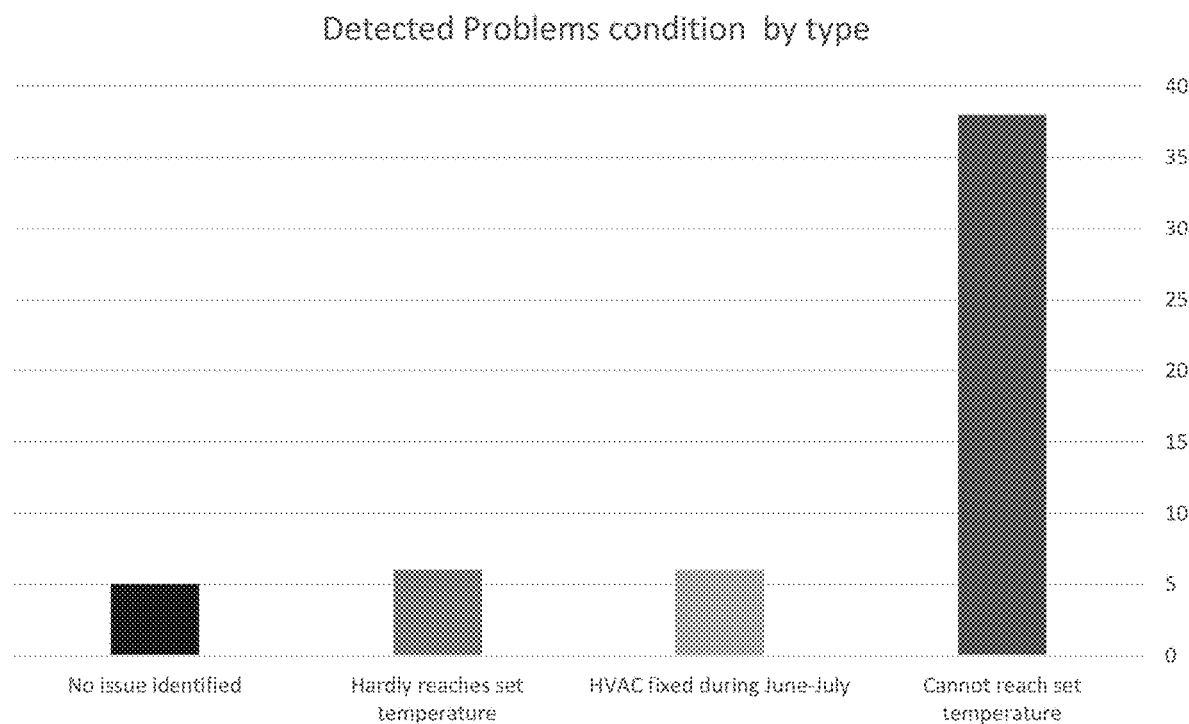

FIG. 8 is a graph of empirical measurements of prediction distribution of label distribution, days the HVAC failed to function (Label Distribution. (Meters with score higher than 0.25 are considered abnormal);

FIG. 9 is a graph of empirical measurements of consumption distribution at different periods showing the prediction success for Meter with low efficiency;

FIG. 10 is a graph of empirical measurements of consumption distribution at different periods showing the prediction success Meter with high efficiency;

FIG. 11 is a graph of distribution of actual condition or problem for HVAC which were in the prediction process were tagged as mal functioning

DETAILED DESCRIPTION

It is to be understood that the invention is not limited in its application to the details of construction and the arrangement of the components set forth in the following description or illustrated in the drawings, but is applicable to other embodiments that may be practiced or carried out in various ways. Furthermore, it is to be understood that the phraseology and terminology employed herein is for the purpose of description and should not be regarded as limiting.

The following is a table of definitions of the terms used throughout this application.

| Term | Definition |
| --- | --- |
| Server module | A module implemented in software or hardware or any combination thereof, consisting of all sub modules required for: accumulating data pertinent to a plurality of households and HVAC systems installed therein; producing predictions of specific HVAC malfunction or inefficiency; and providing alerts based on predicted HVAC malfunction or inefficiency. |
| Household client modules | Modules implemented in software or hardware or any combination thereof, configured to interface with the server module and to transmit data pertaining to a specific household's HVAC system operation. |
| Household profile parameters | A set of parameters relating to each household, including, for example, at least one of: house type (e.g. flat, duplex house etc.), size (area and volume), age, geographic location, regional climate, level (e.g. top story, bottom floor), and orientation (south-bound, north-bound, etc.). |
| Resident profile parameters | A set of parameters relating to the residents of each household, including for example at least one of: number of residents, relationship of residents (e.g. family, married couple, roommates), lifestyle parameter (e.g., hours in which they occupy the residence), etc. |
| Training household group | A group of households upon which an HVAC classification model is trained during periods of spring weather (e.g. spring time). Households within the training group provide data that includes one or more of the following data types: Household profile parameters; Residents profile parameters; and Regular readings of overall household power consumption (e.g. every 15 min, that is, a rate of approximately 4 readings per hour). Optionally these houses also provide their Hvac consumption (more specifically compressor time) as well as set and actual indoor temperature This information is obtained with respect to households within the training group for periods of spring and summer weather (e.g. springtime and summertime, respectively), and serves to train the supervised HVAC efficiency classification model. |
| Operational household group | A group of households monitored after the training period. Such households provide at least some of the following data: Information regarding the household profile parameters and residents' profile parameters; and Overall household power consumption. This information is obtained with respect to these households during periods of spring weather (e.g. spring time) only, and serves to predict whether HVACs of these households would efficiently reach the thermostat setting temperature during ensuing periods of summer weather (e.g., summer or winter). |
| First time period (spring/fall) weather period | Period of initial training and subsequent operational monitoring of the system, when HVACs generally reach and maintain thermostat setting temperatures (e.g., during spring or fall). |
| Second ((summer or winter)weather period | Period when HVACs that are malfunctioning may not efficiently reach the thermostat temperature settings (e.g., when cooling during summer, or heating during winter). |

Figure 1:
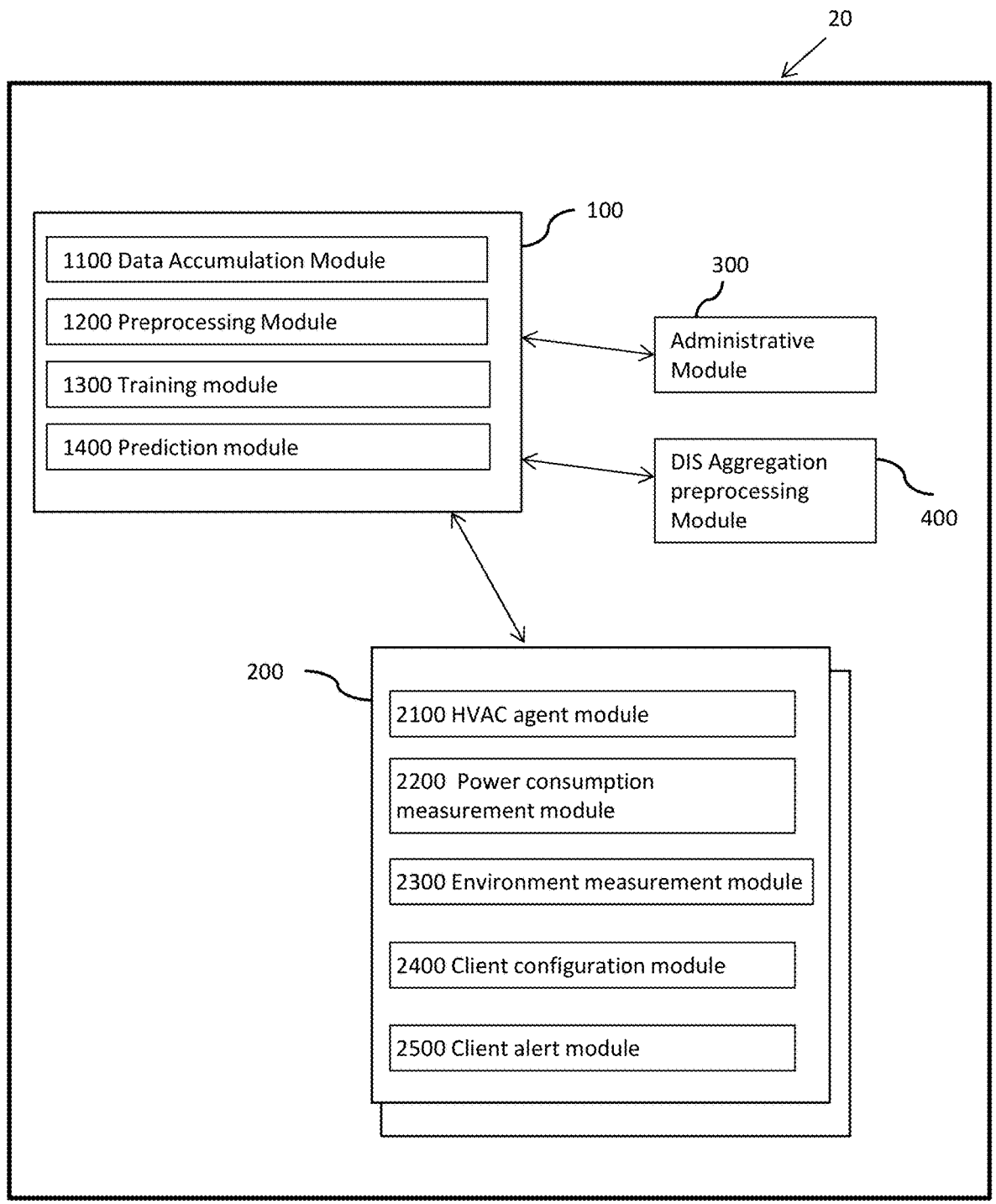
FIG. 1 is a block diagram depicting a system including client modules for collecting data pertaining to specific households and HVAC systems, and for propagating this data to a server, according to some embodiments of the present invention.

FIG. 1 is a block diagram depicting a system 20 including client modules 200 for collecting data pertaining to specific households and HVAC systems, and for propagating this data to a server 100, according to some embodiments of the present invention;

The household client modules are configured to interface the server module 100 using any type of wired or wireless data communication standard (e.g. LAN, WAN, Wi-Fi, GSM, 3GPP, LTE, etc.), and to convey to the server 100 data pertaining to a specific household. This data includes at least one of the following types of data: the household properties, the household's overall power consumption (measured in 15 minute increments, typically by a smart meter), concurrent indoor and outdoor temperature measurements, and data relating to HVAC systems installed therein.

The household client modules 200 are comprised of at least one of the following submodules: an HVAC agent module 2100, a power consumption measurement module 2200, an environment measurement module 2300, a client configuration module 2400, and a client alert module 2500. Optionally the reading of the of the smart meter is received directly.

The power consumption measurement module 2200 acquires power consumption readings of the household over time. According to some embodiments, the power consumption measurement module 2200 obtains household power consumption readings in a granularity of approximately at predefined interval such as 15 minutes, from a smart household power meter.

The environment measurement module 2300 acquires concurrent indoor temperature and outdoor temperature readings.

The client configuration module 2400 provides an interface for acquiring household-specific parameters. These parameters may include at least one of the HVAC's properties (e.g. make, model, power rating); the household profile parameters (e.g. age, location and size); and residents' profile parameters (e.g. number of residents, household occupancy throughout the day).

The client alert module 2500 provides an interface for receiving alerts regarding suspected inefficiency of the HVAC, according to the logic explained further below.

The server 100 may be implemented in software or hardware or any combination thereof, configured to interface a plurality of household client modules 200, according to some embodiments. The server 100 obtains from each of the plurality of household client modules 200 data pertaining to each respective household, the data including at least one of the following data types:

Frequent regular household power consumption readings;
Indoor temperature;
Outdoor temperature;
Humidity;
HVAC properties (e.g.: make, model, nominal power consumption, rated efficiency);
Household profile parameters (e.g.: size, location, climate); and
Resident profile parameters.

According to some embodiments, the server module 100 also communicates with an administrative client module (not shown), which provides an administrative interface for system configuration, real-time alerts and production of historical reports.

The server module 100 includes submodules for analyzing said obtained data, identifying specific HVACs as efficient or inefficient, predicting the function of specific HVACs during periods of summer weather conditions, and alerting against suspected conditions of inefficiency or malfunction. The submodules include at least one of the following:

The data accumulation module 1100
The data preprocessing module 1200
The training module 1300
The prediction module 1400

The data accumulation module 1100 accumulates real-time data from multiple private client modules, and stores it in a database for further processing.

The data preprocessing module 1200 applies various algorithms to produce the following explanatory features, also referred to as "derived parameters":

Household Efficiency Score
HVAC Linear Coefficient
Breakpoint Temperature Difference.

The training module 1300 applies machine learning algorithms to data from households within the training group, to produce an HVAC efficiency classification model, distinguishing between "efficient" and "inefficient" households, as elaborated further below.

The prediction module 1400 applies the HVAC efficiency classification model to households within the operational group of monitored households, predicting during spring weather conditions whether HVACs installed therein will operate efficiently in summer weather conditions.

An HVAC as is considered as inefficient not being able to reach within predefined time of the predefined set temperature. However, we do not include cases in which the set temperature is changed, and the room gradually begins to cool down.

According to the present invention is provided an algorithm for generating a daily score for the HVAC efficiency, based on disaggregation output (see, FIG. 9) integrated with pattern (recognition) algorithms for identifying repeating pattern behavior of normal behavior of the HVAC such as seen in FIG. 4A and dB relating only to the total consumption graph. It is suggested to aggregate the monthly scores over the different temperature bins, to test the HVACs response to temperature. Finally, is trained a classifier based on our abovementioned labels, and feed it with the aggregated features.

Figure 2:
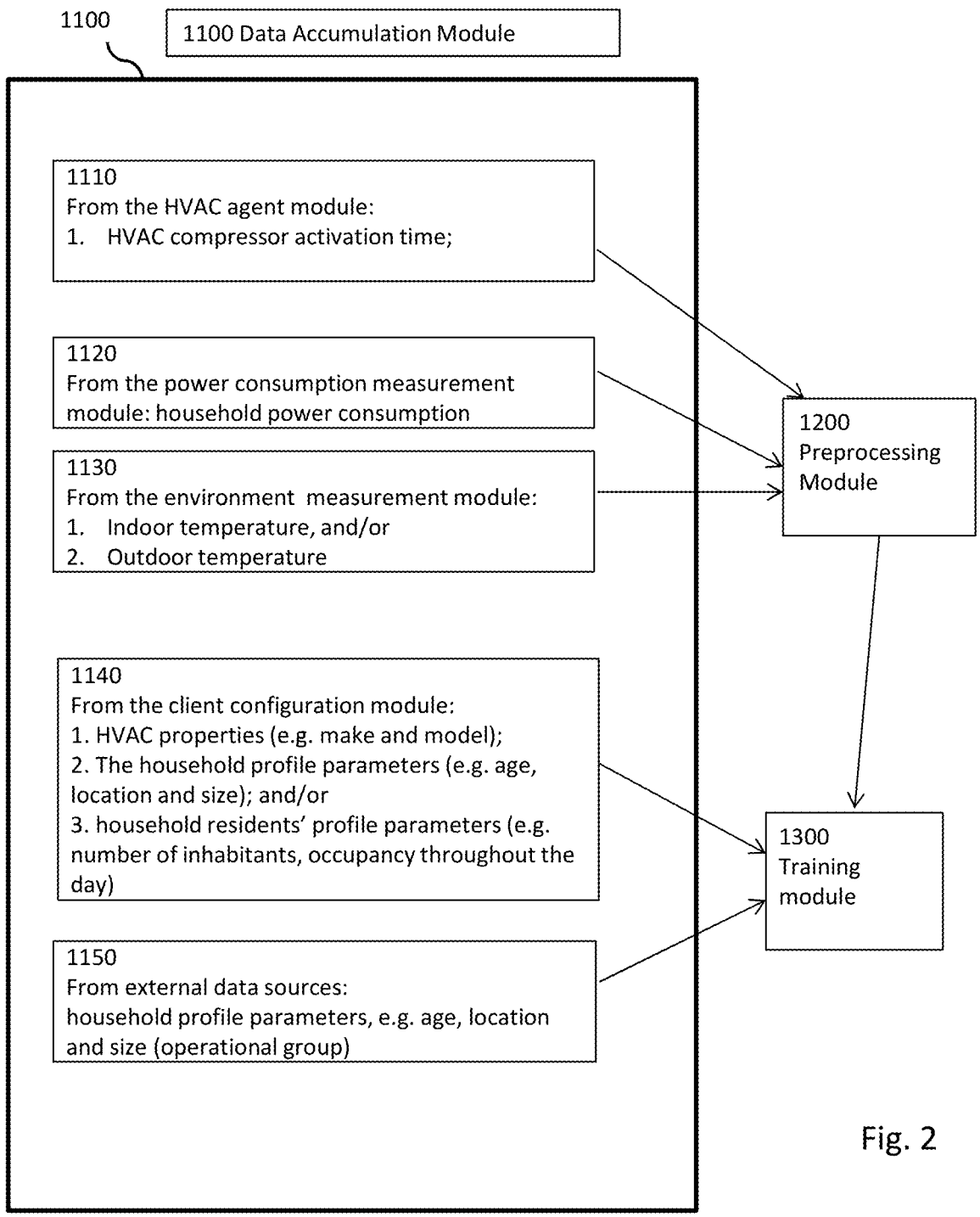
FIG. 2 is a flow diagram depicting the function of a data accumulation module, running within the server, to accumulate data pertaining to specific households in a training group and in an operational group, according to some embodiments of the present invention.

FIG. 2 is a flow diagram depicting the flow of data to the data accumulation module 1100 according to some embodiments of the present invention. The data accumulation module 1100 acquires and stores the following data.

Household power consumption over a time period for each household, within the household training group, may be acquired from the power consumption measurement module 2200, at a step 1120. According to some embodiments, the power consumption measurement module 2200 obtains household power consumption readings in a measurement granularity of one reading at predefined interval such as each 15 minutes or 60 minutes from a smart household power meter.

Indoor and outdoor temperatures for each household, within the household training group, may be acquired from the environmental measurement module 2300, at a step 1130. According to one embodiment, the indoor and outdoor temperatures may be acquired by respective sensors, physically located at the household's location. According to another embodiment, the outdoor temperature may be acquired elsewhere, e.g. from online weather services.

Data collected at steps 1110, 1120 and 1130 are time-based, operational data. The data accumulation module 1100 subsequently transmits this data to the preprocessing module 1200, as described hereinbelow.

The data accumulation module 1100, at steps 1140 and 1150, also acquires non-operational data from the client configuration module 2400. This include HVAC properties, such as make, type, nominal power, age and HVAC ratings, which may including Energy Efficiency Rating (EER), Seasonal Energy Efficiency Rating (SEER), Coefficient of Performance (COP), and Heating Seasonal Performance Factor (HSPF). The client configuration module 2400 also provides household profile parameters (e.g., house size, type, location, age, geographic location and climate) and residents' profile parameters (e.g., number of residents, and household occupancy during the day). This information is comprehensively gathered for households of the training group. Households of the operational group may or may not provide this data, or may only provide a subset of the said data.

Household profile parameters (e.g. age, location, size, type etc.) may be acquired from external sources (e.g. aerial or satellite photographs, online web sites, municipal databases, etc.), at a step 1150.

According to some embodiments of the present invention, the data accumulation module incorporates an interface to a database, facilitating the query of accumulated data by other components of the server module 1000. As indicated in FIG. 2, the operational data is provided to the training module 1300 after preprocessing by the preprocessing module 1200. The non-operational data is typically provided directly to the training module 1300.

Figure 3:
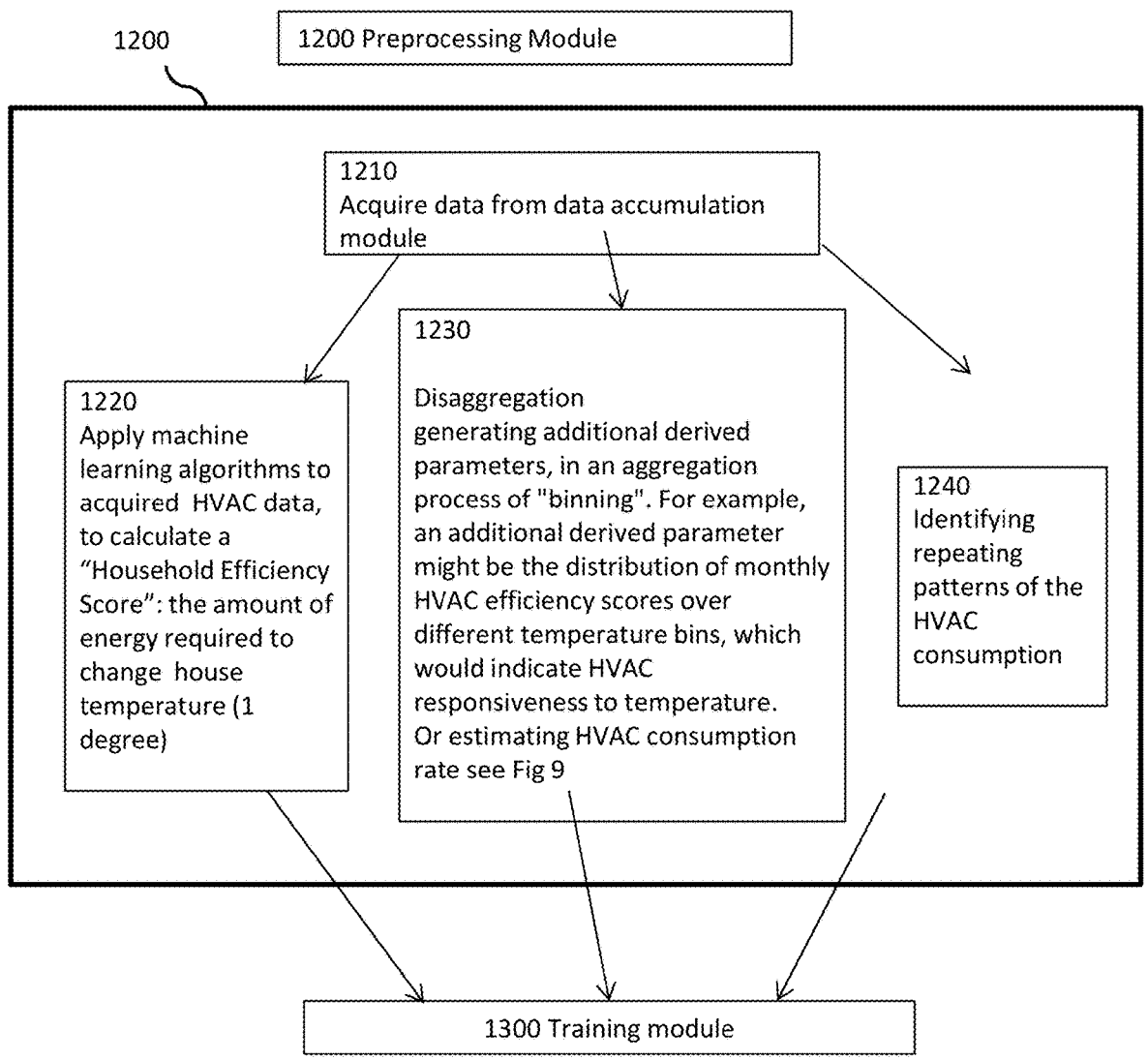
FIG. 3 is a flow diagram depicting the function of a data preprocessing module, running within the server, configured to produce household-specific explanatory features, according to some embodiments of the present invention.

FIG. 3 is a flow diagram depicting the function of the preprocessing module 1200, running within the server, configured to produce household-specific explanatory features, according to some embodiments of the present invention. These explanatory features, or "derived parameters" are later used by the training module 1300, to create a model for classifying household HVACs as "efficient" or "inefficient".

The preprocessing module 1200 acquires data pertaining to specific households, as obtained by the data accumulation module, at a step 1210.

The preprocessing module 1200 may apply machine learning algorithms to the data acquired for each household, to calculate a "Household Efficiency Score", i.e., the amount of energy required in order to cool-down or heat-up the house by 1 degree (e.g., Fahrenheit or Celsius), at a step 1220 in relation to house size. Optionally, the preprocessing module 1200 may correlate the HVAC compressor activation time with the household's overall power consumption readings, to create a disaggregation model for deriving an estimate of HVAC power consumption (that is, time-based, power consumption) from the overall household power consumption. Based on the disaggregation model, the preprocessing module may generate derived parameters for the training module 1300 that are all derived from the overall household power consumption, that is, from "smart meter" readings. The processing module further identifies repeating patterns of the HVAC consumption (1230).

FIG. 5 is a flow diagram depicting the function of a training module, running within the server, to classify households by an HVAC efficiency classification model, predicting whether an HVAC would efficiently reach the thermostat settings during second weather periods such summer weather (i.e., cooling during summer time, or heating during winter time), according to some embodiments of the present invention. The HVAC efficiency classification is based on data collected during first weather periods such as spring weather fall, labelled with results measured during summer weather periods (respectively summer or winter). Labels classify household HVACs as either "efficient" or "inefficient", and may also include additional classifiers, such as whether the HVAC is malfunctioning, whether undersized or oversized, and whether additional parameters are preventing proper HVAC operation, such as insufficient insulation.

The training module 1300 accumulates at least part of the following data from each monitored HVAC within the household training group, at a step 1310:
Household Efficiency Score (from the preprocessing module);
Household profile parameters (from the data accumulation module); and
Resident profile parameters (from the data accumulation module).
Disaggregation features
Identified repeating patterns
The above parameters are also referred to herein below as the HVAC efficiency explanatory features.

At a step 1320 the training module 1300 may acquire, during periods of summer weather (i.e., summer or winter), additional data with respect to each monitored HVAC within the household training group. This data indicates whether the HVAC has efficiently reached the thermostat setting temperature, and thus serves as feedback for supervising the training of the HVAC efficiency classification model.

Manual surveying of household HVAC operation HVAC can also be applied to distinguish the following conditions, which may also be used as classification labels:
Low maintenance level: filters dirty
Summer comfort settings: household occupants chose a set temperature that is harder to reach
Incompatible HVAC: HVAC capacity doesn't fit the space (undersized).
Envelope problem: poor insulation causes temperature loss
HVAC recognized as malfunctioning, for example, by technician report. In some cases, the system may also identify a sudden change in HVAC operation, indicating that the HVAC has been fixed.

Returning to FIG. 5, the training module 1300, at a step 1330, trains a supervised machine learning algorithm from the HVAC data accumulated during first weather periods such as spring weather, and labeled according to second weather period operation. It thus creates an HVAC efficiency classification model. As described above with respect to the preprocessing module 1200, the training may include disaggregated HVAC power consumption estimates based on overall house energy consumption, in order to create a model for predicting HVAC efficiency based solely on the overall house energy consumption. The training process may include generating additional derived parameters, in an aggregation process of "binning". For example, an additional derived parameter might be the distribution of monthly HVAC efficiency scores over different temperature bins, which would indicate HVAC responsiveness to temperature. The goal is to predict when an HVAC will not be able reach a desired set temperature, within the near future (2-4 months ahead).

The processing of the History Analyzing Module comprises the following steps:
pre-processing historical consumption of appliances of surveyed households based on actual measurements by sensors associated with said appliances in relation to profile of household including characteristics of the household and/or lifestyle of the occupant and environmental time dependent parameters (step 110);
applying learning algorithm for identifying statistical correlations between presence of appliances in a household and one or more of the following parameters: 1) household profiles parameters, 2) household actual periodic consumption pattern, and 3) household actual periodic consumption pattern in relation to environmental time dependent parameters (step 120). An option according to some embodiments of the present invention is that the learning algorithm is a gradient boosting learning machine algorithm; building a household appliance presence model which defines the relation between the presences of each appliance and the household profile consumption based on identified statistical correlation of both household profile and global consumption parameters (step 130);

FIG. 6 is a flow diagram depicting the function of the prediction module 1400, running within the server 100, configured to apply the HVAC efficiency classification model to data from an operational group of households, according to some embodiments of the present invention. The prediction module 1400 predicts the behavior of HVAC systems in periods of summer weather (or extreme thermostat settings, that is, when the thermostat setting temperature is significantly different from the outside temperature), and may alert users of HVAC inefficiency or malfunction.

At a step 1410, the prediction module 1400 acquires data from monitored households in the operational group, during periods of spring temperature.

At a step 1420, the prediction module 1400 classifies households within the operational group of monitored households, to associate each such household with either one of the two HVAC efficiency model classes: "efficient" or "inefficient".

At a step 1450, the prediction module 1400 examines households that have been classified as "inefficient". It compares the extracted HVAC power consumption with that of its peers, that is, households with similar HVAC profiles and resident profiles. The prediction module 1400 thus determines whether the HVAC may be inefficient due to a malfunction, or whether it is simply undersized or oversized in relation to the household's properties, only based on overall household power consumption.

At a step 1460, according to some embodiments, in case of a suspected malfunction, the prediction module 1400 calculates the excess in power consumption in comparison with similar households, to produce a malfunction "price tag".

According to one embodiment, the prediction module 1400 may emit an alert to the household client module and/or to an administrative interface, indicating whether the HVAC is suspected as inefficient or malfunctioned, or whether it is suspected to be oversized or undersized, at a step 1470. In case of a suspected malfunction, it may also attach the "price tag" calculation, to enable occupants to understand the seriousness of the HVAC malfunction.

According to the present invention, the only data available to the prediction module 1400 is the household consumption measurement and weather data. The preprocessing module is trained as described above by a supervised machine learning process, to estimate the preprocessing module parameters based on the overall household consumption measurement (which is typically smart meter data acquired at predefined intervals e.g. 15 minute). Labeling may be automated with all the methods described previously, that is, with multiple data collection sources. Subsequently, the prediction process is based solely on monitoring of the overall household consumption measurement.

FIG. 7 is an illustration flow chart of a household appliance consumption usage model according to some embodiments of the preset invention. The model of the appliance usage calculation include at least some of the following steps:

pre-processing per meter of households of historical consumption of appliances based actual measurement performed by sensors associated with the HVAC in relation to profile of household including characteristics of the house and/or lifestyle of the occupant and environmental time dependent parameters (810); identifying statistical correlations between actual consumption rate of the HVAC and 1) household actual periodic consumption patterns of the HVAC in relation to environmental time dependent parameters or lifestyle of the occupant 2) household profile and the global consumption rate of each appliance 3) consumption of other appliances; (820)

building a household the HVAC usage consumption model which defines the relation between the consumption of the HVAC and the household global consumption based on identified statistical correlation of both household profile and consumption parameters (840); applying the model to the identified actual profile of analyzed household and its consumption patterns (840) to calculate a consumption rate of the HVAC.

FIG. 8 is a graph of empirical measurements of prediction distribution of label distribution, days the HVAC failed to function (Label Distribution. (Meters with score higher than 0.25 are considered abnormal);

FIGS. 9 and 10 show empirical graphs depicting the derived parameter, "Daily Household Efficiency Score" for individual households, as a function of temperature for multiple days of the two different training periods, the mild weather period and the extreme (i.e., harsh) weather period. FIG. 9 depicts a household in which the efficiency is designated as being low. The preprocessing module derives, from the data acquired, "Daily Household Efficiency Scores" that are relatively low on most days, both during the spring weather period, and subsequently during the summer weather period. Similarly, FIG. 10 depicts a household in which the efficiency is designated as being normal. The preprocessing module derives, from daily data acquired, "Daily Household Efficiency Scores" that are relatively high on most days, both during the mild weather period, and subsequently during the summer weather period.

FIG. 11 is a graph of distribution of actual condition or problem for HVAC which were in the prediction process were tagged as mal functioning. Most tagged HVAC were later identified as cannot reach set temperature as predicted, some of them were fixed before the high season, and some can reach the set temperature but not easily.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

It is to be understood that throughout the specification terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data that may be electronic quantities within the computing system's memory into other data similarly represented as physical quantities within the computing system's memory.

The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

It is appreciated that software components of the present invention including programs and data may be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order, any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; a program pre-stored e.g. in memory or on an information network such as the internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

The invention claimed is:

1. A method for monitoring a plurality of heating, ventilation, and air conditioning (HVAC) systems and predicting inefficient HVAC operation, implemented by one or more processors operatively coupled to a non-transitory computer readable storage device, on which are stored modules of instruction code that when executed cause the one or more processors to perform the following steps:
   obtaining first training data for HVACs in a training set of households during a first period of spring weather;
   obtaining second training data for HVACs in the training set of households during a period of summer weather;
   wherein the first and second training data are acquired using smart meters by acquiring regular readings of overall household power consumption;
   wherein the first and second training data include indoor temperature and thermostat setting temperature, this first and second training data is used only in a training phase as training data for the supervised machine learning algorithms which are:
      determining a "household efficiency score" by detecting HVAC efficiency;
      HVAC efficiency being defined by the amount of energy required to change house temperature by a defined number of degrees in relation to house size;
      HVAC efficiency being calculated based on measured household power consumption in relation to outside temperature;
      predicting the HVAC efficiency in a coming summer period using only household usage and weather data of a spring period;
      wherein the spring period has different weather conditions than the summer period;
   applying the first training data and the classification labels to train a supervised machine learning algorithm, to generate an HVAC classification model predictive of inefficiency during periods of summer weather conditions based on the household efficiency score and identified repeating patterns of HVAC consumption;
   obtaining operational data pertaining to HVACs in an operational set of households during a second period of spring weather; and applying the HVAC classification model to predict inefficiency of HVACs at individual households in the operational set during periods of summer weather using only overall household power consumption.

2. The method of claim 1 wherein the training data include: Frequent regular household power consumption readings; Indoor temperature; Outdoor temperature; household-specific parameters including at least one of HVAC's properties, the household profile parameters and residents' profile parameters, wherein the HVAC properties, include at least one of type, nominal power, age and HVAC ratings, including Energy Efficiency Rating (EER), Seasonal Energy Efficiency Rating (SEER), Coefficient of Performance (COP), and Heating Seasonal Performance Factor (HSPF).

3. The method of claim 1, wherein the calculating further includes calculating HVAC consumption linear coefficient.

4. The method of claim 1 wherein classification module distinguishes between households in terms of being able to reach within predefined time of the predefined set temperature.

5. The method of claim 1 wherein a daily score for the HVAC efficiency is based on pattern recognition algorithms for identifying repeating pattern behavior of normal behavior of the HVAC.

6. The method of claim 1 wherein the power consumption measurement readings are measured granularity of a single reading each 15 minutes from a smart household power meter.

7. The method of claim 1 further comprising the steps of correlating the HVAC compressor activation time with the household's overall power consumption readings, to create a disaggregation model for deriving an estimate of HVAC time based power consumption from the overall household power consumption, where in based on the disaggregation model, are derived parameters for the training model.

8. The method of claim 1 wherein the HVAC efficiency classification are further based on classifiers, including at least one of: whether the HVAC is malfunctioning, whether undersized or oversized, insufficient insulation.

9. The method of claim 1 wherein the training include acquire, during periods of summer or winter weather data which indicates whether the HVAC has efficiently reached the thermostat setting temperature, this data serves as feedback for supervising the training of the HVAC efficiency classification model.

10. The method of claim 1 wherein the training process includes generating derived parameters including the distribution of monthly HVAC efficiency scores over different temperature bins, which indicate HVAC responsiveness to temperature.

11. The method of claim 1 wherein in case of a malfunction, calculates the excess in power consumption in comparison with similar households, to produce a malfunction "price tag".

12. A system for monitoring a plurality of heating, ventilation, and air conditioning (HVAC) systems and predicting inefficient HVAC operation, said system comprising a non-transitory storage device and one or more processing devices operatively coupled to the storage device on which are stored modules of instruction code executable by the one or more processors, said systems comprising:

data Accumulation Module for obtaining first training data for HVACs in a training set of households during a first period of spring weather and obtaining second training data for the HVACs in the training set of households during a period of summer weather, wherein the first and second training data are acquired using smart meters by acquiring regular readings of overall household power consumption, and wherein the first and second training data include indoor temperature and thermostat setting temperature, wherein this first and second training data is used only in a training phase as training data for the supervised machine learning algorithms;

preprocessing module for analyzing the training data to identify repeating patterns of HVAC consumption;

training module for determining a "Household Efficiency Score" by detecting HVAC efficiency by calculating the amount of energy required to change house temperature by defined number of degrees in relation to house size based on measured power consumption in relation to temperature, HVAC efficiency being calculated based on measured household power consumption in relation to outside temperature, and for applying the first training data and the classification labels to train a supervised machine learning algorithm, to generate an HVAC classification model predictive of inefficiency during periods of summer weather conditions based on said Household Efficiency Score and identified repeating patterns of HVAC consumption;

prediction module for obtaining operational data pertaining to HVACs in an operational set of households during a second period of spring weather; and applying the HVAC classification model to predict inefficiency of the HVACs at individual households in the operational set during periods of summer weather using only overall household power consumption, wherein the period of spring weather has different weather conditions than the periods of summer weather.

13. The system of claim 12 wherein the training data include: Frequent regular household power consumption readings; Indoor temperature; Outdoor temperature; household-specific parameters including at least one of HVAC's properties, the household profile parameters and residents' profile parameters, wherein the HVAC properties, include at least one of type, nominal power, age and HVAC ratings, including Energy Efficiency Rating (EER), Seasonal Energy Efficiency Rating (SEER), Coefficient of Performance (COP), and Heating Seasonal Performance Factor (HSPF).

14. The system of claim 12, wherein the calculating further includes calculating HVAC consumption linear coefficient.

15. The system of claim 12 further comprising classification module distinguishes between households in terms of being able to reach within predefined time period of the predetermined desired set temperature.

16. The system of claim 12 wherein a daily score for the HVAC efficiency is based on pattern recognition algorithms for identifying repeating pattern behavior of normal behavior of the HVAC.

17. The system of claim 12 wherein the power consumption measurement readings are measured granularity of a single reading each 15 minutes from a smart household power meter.

18. The system of claim 12 wherein the HVAC compressor activation time is correlated with the household's overall power consumption readings, to create a disaggregation model for deriving an estimate of HVAC time based power consumption from the overall household power consumption, where in based on the disaggregation model, are derived parameters for the training model.

19. The system of claim 12 wherein the HVAC efficiency classification are further based on classifiers, including at least one of:

whether the HVAC is malfunctioning, whether undersized or oversized, insufficient insulation.

20. The system of claim 12 wherein the training includes acquire, during periods of summer or winter weather, data which indicates whether the HVAC has efficiently reached the thermostat setting temperature, this data serves as feedback for supervising the training of the HVAC efficiency classification model.

21. The system of claim 12 wherein the training process includes generating derived parameters including the distribution of monthly HVAC efficiency scores over different temperature bins, which indicate HVAC responsiveness to temperature.

22. The system of claim 12 wherein in case of a malfunction, calculates the excess in power consumption in comparison with similar households, to produce a malfunction "price tag".

* * * * *